United States Patent Office 3,183,145
Patented May 11, 1965

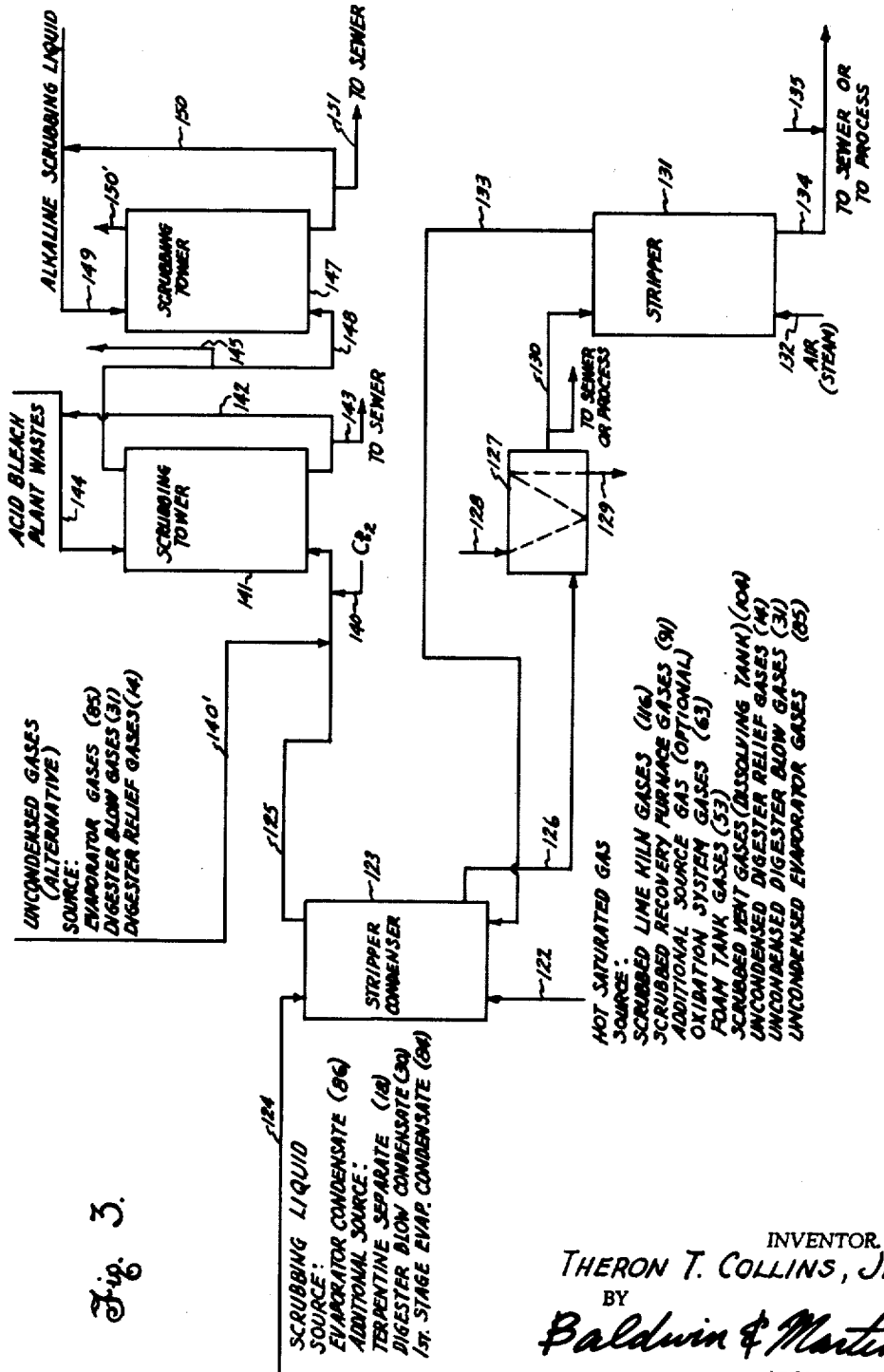

3,183,145
ODOR CONTROL AND HEAT RECOVERY IN WOOD PULPING PROCESS
Theron T. Collins, Jr., 804 Cedar St., Manistee, Mich.
Filed June 22, 1962, Ser. No. 204,541
10 Claims. (Cl. 162—47)

This invention relates to wood pulping processes and more particularly to methods for controlling the pollution of the atmosphere and bodies of water in the vicinity of wood pulping mills.

One object of the invention is to provide methods for controlling the pollution of the atmosphere and streams with noxious gaseous materials that are produced in wood pulping processes and by procedures which enable the recovery of heat from certain of the waste gases which constitute sources of such pollution.

Still another object of the invention is to provide a method for treating normally waste condensates and gases that are produced during wood pulping procedures so that the objectionable components of such wastes are destroyed and/or rendered less noxious.

Still another object of the invention is to provide a method for controlling the objectionable release of noxious odors from wood pulping processes which enables the recovery of otherwise lost heat in normally waste gases derived from such process and further enables the simultaneous recovery of reusable water that otherwise would normally be discharged as wastes.

The invention will be most particularly described hereinafter in its relationship to the principal steps followed in the well known sulphate wood pulping processes. It will be appreciated by those skilled in the art, however, that the processes described herein may be readily adapted for use with other wood pulping processes that emit waste condensates which contain such odoriferous and noxious gaseous substances as methyl mercaptan and hydrogen sulphide and that also emit hot water-vapor laden gases which contain sulphur dioxide, all of which create sources of stream and/or atmospheric pollution.

The sulphate process is well known and includes a wood pulping phase in which the wood is transformed into a fibrous pulp by procedures that include the treatment of the wood with chemicals contained in a cooking liquor. Still another phase of the process is directed to recovering the chemicals which remain in the spent cooking liquor derived from the cooking procedure. It is well known that both of the phases contribute to atmospheric and stream pollution and that large amounts of heat are lost in the recovery phase with certain hot gases that heretofore could not be economically treated for the recovery of their heat content.

Accordingly, an important object of the invention is to provide a process for controlling atmospheric and stream pollution while simultaneously enabling the economical recovery of heat from hot waste gases derived from the recovery phases of the sulphate-type processes.

Among the gases which are normally emitted directly to the atmosphere in modern sulphate or kraft mill wood pulping operations and which constitute sources for the contamination thereof with noxious odoriferous gaseous materials may be mentioned the following: (1) The gases which are obtained by relieving the digesters and which remain uncondensed after passage through the indirect condensers that are normally used for condensing water vapor and turpentine components of such relief gases. (2) The digester blow gases which remain uncondensed after passing through the condensers provided in the process for recovering heat from such gases. (3) The gases which emanate from the foam breakers used in breaking the black liquor foam that is produced in the process, such as the gases from the foam breakers which are normally operated in conjunction with the foam tanks to which the filtrate from the pulp washing operation is passed. (4) Uncondensed gases which are emitted during the stagewise concentration of the black liquor in the recovery phase of the process. (5) The scrubbed gases which are derived from the recovery furnace in which the heavy black liquor is burned to recover heat from the ligneous wood components dissolved therein. (6) The vent gases which emanate from the dissolving tank when the smelt is dissolved in water to form the causticizable green liquor. (7) The scrubbed gases which are derived from the lime kiln operated in the chemical recovery phase. (8) The gases which are derived from the black liquor oxidation step, when such a step is embodied in the sulphate process as a means for reducing the loss of odoriferous substances during the stagewise concentration of the black liquor.

In addition to the gases normally discharged directly to the atmosphere as waste gases there are various condensates which are recovered in the operation of a sulphate mill and which also contain substantial quantities of the malodorous substances in a dissolved state therein. Among such condensates may be mentioned: (1) The turpentine separate obtained from condensing turpentine and water vapor components emitted with the digester relief gases. (2) The digester blow condensate which is condensed from the vapors emitted during the blow of the digesters. (3) The condensates derived during the stagewise concentration of the black liquor by multiple effect evaporation procedures that are commonly employed in modern sulphate processing procedures.

When one or more of the above condensates are discharged to a stream, lake or other body of water, they not only gradually give up a portion of the dissolved odoriferous substances to the atmosphere, thus causing atmospheric pollution and contamination, but in addition, they create a demand for oxygen in the waters to which they are discharged because of their high content of organic materials. This oxygen demand consequently deprives fish, vegetation and other life of the necessary oxygen to sustain such life. Among the components present in the various condensates may be mentioned hydrogen sulphide, methyl sulphide, dimethyl sulphide, methyl alcohol, resins and salts of the various fatty acids, all of which are toxic to fish life, and in most cases, even when present in the streams, lakes and the like in minute amounts. To avoid these problems, it is desirable to reuse the condensates in one or more of the processing steps so as to retain the objectionable substance within the system. Among the uses which may be made of such condensates may be mentioned their use for pulp washing or for lime mud washing. Such uses are not entirely satisfactory, however, since substantial portions of the dissolved gases escape from the condensates while being thus reused and create an overall source of atmospheric contamination.

Various methods have been proposed to solve the above problems and in some cases have actually been installed in sulphate mills. These methods have, however, been primarily directed to controlling contamination from but one source and in some cases, although eliminating the contamination from the source, have added to the atmospheric contamination and/or stream pollution attributed to other sources in the mills.

One aspect of the invention is directed to recovering heat and to controlling the release of noxious sulphur dioxide to the atmosphere from hot gases that are derived from such sources as the recovery furnace and the lime kiln while simultaneously utilizing the sulphur dioxide content of such source gases for controlling the release of other noxious sulphur compounds from other contaminating source materials. It has been found, for example, that the sulphur dioxide content of the hot gases will react with hydrogen sulphide and methyl mercaptan dissolved in the various condensates to form innocuous substances, presumably in accord with the following equations, and most readily when the hot gases are saturated with water vapor:

(1) $2H_2S + SO_2 \rightarrow 2H_2O + 3S$
(2) $2CH_3SH + SO_2 \rightarrow 2CH_3OH + 3S$ This makes it possible to reduce the amount of chlorination necessary to render odoriferous components in the hot gases and in the condensates innocuous where such oxidation type treatments are desired to more or less completely control contamination and pollution from such source materials. According to this aspect of the invention, sulphur dioxide containing gases derived from the lime kiln and/or the recovery furnace are intimately contacted with one or more of the condensates containing such odoriferous sulphur compounds as hydrogen sulphide and methyl mercaptan, and under conditions which cause condensation of at least a portion of the water vapor in the hot gases. By reasons of the intimate contacting procedure, a portion of the $SO_2$ content of the hot gases reacts with a portion of the $H_2S$ and/or methyl mercaptan content of the condensates to render the undesirable odor producing compounds innocuous. Simultaneously, the alkaline components of such condensates are carbonated and the condensates are stripped of substantial portions of the unreacted odoriferous sulphur compounds. The effluent gases from the step are then oxidized, preferably using active chlorine containing bleach plant wastes, to oxidize the remaining odoriferous materials in the effluent gases. As for the stripped condensates and the condensed water vapor derived from the step, these condensates are then most advantageously cooled so as to recover a portion of their heat content and to simultaneously render the residual unstripped odoriferous gases more soluble therein, so as to enable reuse of the stripped condensates in the pulping process for washing or other purposes, or enabling their discharge as waste materials which are substantially free of contaminating or polluting substances.

In the modern sulfate mill, a certain amount of heat in the gases emitted from the lime kiln and recovery furnaces is normally recovered in the scrubbing procedures to which such hot gases are subjected, black liquor being commonly employed for scrubbing the recovery furnace gases, whereas the filtrate from the lime mud washers is frequently employed for scrubbing the gases from the lime kiln. The gases derived from these scrubbing operations are usually nearly saturated with water vapor and at temperatures usually in excess of about 150° F. Accordingly, the scrubbed gases still contain recoverable heat in the form of latent heat of vaporization which may be recovered by steps which include condensing a portion of the water vapor therein. By further treating these scrubbed gases with the odoriferous material containing condensates, they can be further cooled to recover a portion of their latent heat and simultaneously employed to render a portion of the odoriferous gas content of such condensates innocuous.

In accord with one embodiment of the invention, the condensates which are most highly contaminated with dissolved normally gaseous odorous sulphur compounds, e.g. the turpentine separate, the digester blow condensate and the evaporator condensate from the first stage of concentration, are employed, and preferably together with such make-up as is needed to supply the demands of the causticizing system for scrubbing the lime kiln gases so that the gaseous odoriferous components of the condensates are stripped from the condensates during the scrubbing procedure to thus render such stripped condensates reusable in the causticizing system. The less contaminated condensates, such as those received from the subsequent evaporation stages, are then used, for subsequently treating the hot water-laden sulphur dioxide gases such as those gases emanating from the lime kiln gas scrubbing procedure and/or those derived from the recovery furnace. By this procedure, the more contaminating aqueous source materials are treated to remove the noxious gases dissolved therein, and then retained in the overall process, whereas the less contaminated concentrates are used to treat the contaminating sulphur dioxide containing gases to in part render such gases less noxious as shown hereinafter.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings, in which:

FIGURE 3 is a schematic illustration showing certain processing steps involved in accord with certain aspects of the invention for controlling atmospheric contamination and stream pollution.

Figure 1:
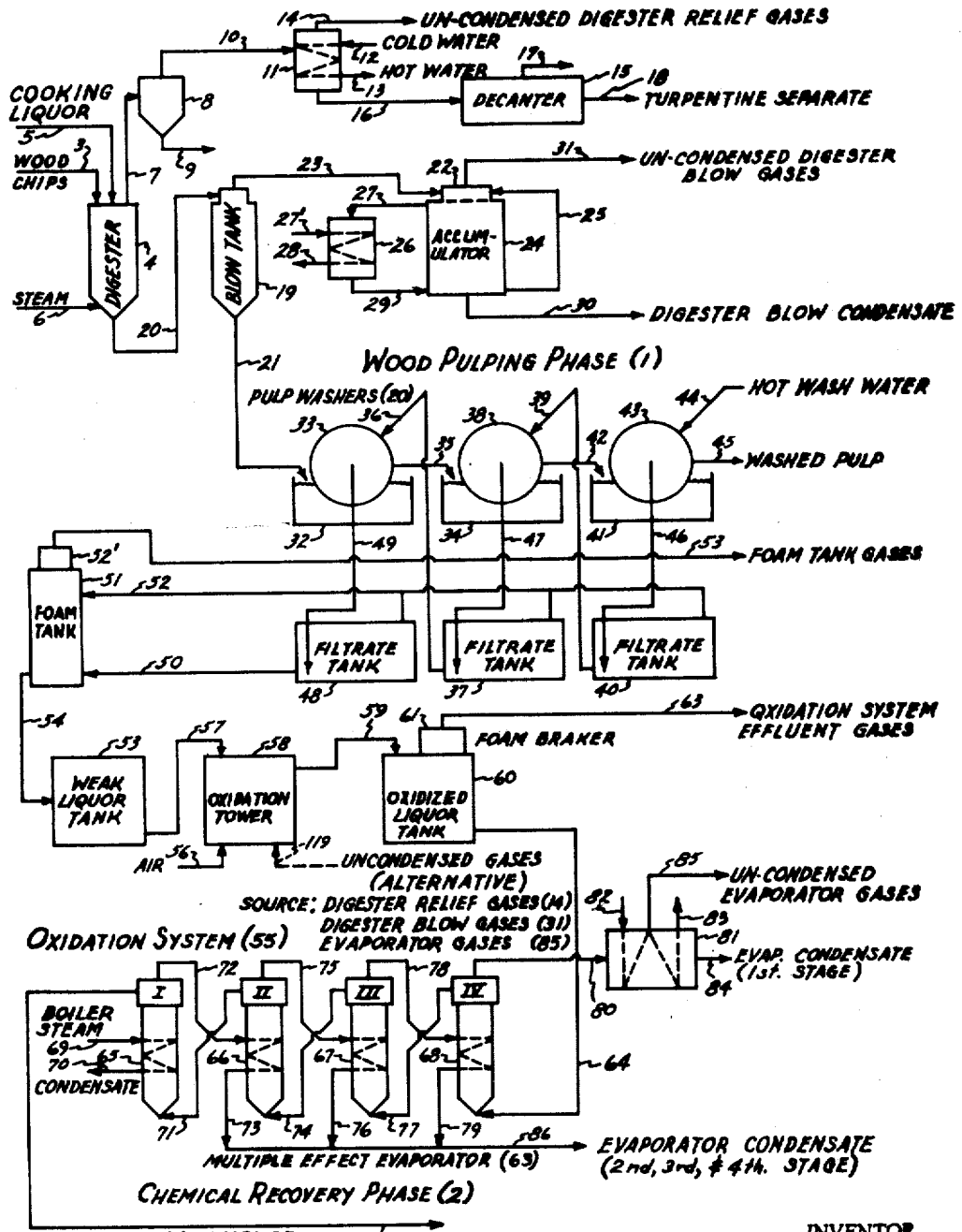
FIGURE 1 is a schematic flow diagram illustrating certain steps which are normally followed in the pulping phase of a sulphate process, and further illustrates certain preliminary steps which are normally followed in the chemical recovery phase of such process as practiced in modern sulphate mills.

With particular reference to FIGURE 1, the wood pulping phase of the process is generally indicated at 1 whereas portions of the chemical recovery phase of the sulphate process are schematically illustrated at 2.

In the pulping phase 1 of the illustrated process, wood

In the pulping phase 1 of the illustrated process, wood chips 3 are fed to the digesters 4 together with cooking liquor 5. During the cooking procedure, steam 6 is admitted to the digesters 4 to elevate the temperature and pressure therein, and the digesters are relieved to expel non-condensible gases, the digester relief gases passing out of the digesters 4, as indicated at 7. These gases are passed to a separator 8, which may be of the usual cyclone type, wherein entrained solid and liquid matter is separated from the gaseous components and removed as indicated at 9. The gases from separator 9, indicated at 10, are then passed to an indirect heat exchanger 11. Most of the water vapor and turpentine in the gases passed to the heat exchanger 11 are condensed therein by indirect heat exchange and removed, as at 16, and passed to a decanter 15. Heat in the gases is recovered in the exchanger 11 by passing cold water 12 through the exchanger 11 and recovering the heat in the form of hot process water 13. The uncondensed digester relief gases, which include hydrogen sulphide and methyl mercaptan among others, pass from the exchanger 13 as indicated at 14, and may be treated in accord with certain aspects of the invention as indicated hereinafter. The condensate 16 from condenser 11 and which is passed to the turpentine decanter tank 15 is decanted therein to separate the turpentine from the aqueous components, the turpentine being removed from the tank 15 as indicated at 17, whereas the aqueous separate is removed as at 18 and may be treated as indicated hereinafter.

After the wood has been suitably digested, the digester content is blown as indicated at 20 to a blow tank 19. The pulp and black liquor which collects in the bottom of the tank 19 may be passed to the pulp washers 20 as indicated by arrow 21. The blow gases 23 from blow tank 19 pass to a direct contact heat exchanger 22 wherein the water vapor is condensed by direct contact with cooled condensate, derived from the accumulator 24, and which is passed to the heat exchanger 22 as indicated by arrow 25. Heat from the digester blow condensate that accumulates in the top of the accumulator 24 is recovered by passing the hot condensate 27 to indirect heat exchanger 26, wherein the condensate is cooled by heat exchange with cold water 27' admitted to the exchanger 26 and removed as hot water at 28, the cooled blow condensate being returned to the bottom of the accumulator 24, as indicated at 29.

The cooled blow condensate contains dissolved normally gaseous odoriferous sulfur compounds, principally hydrogen sulphide and methyl mercaptan, and is removed from the accumulator 24 as at 30 and may be treated as hereinafter indicated in accord with certain aspects of the invention. The uncondensed digester blow gases also contain such odoriferous sulphur substances and pass, as indicated at 31, from the direct contact heat exchanger 22, whereafter they may be treated as indicated hereinafter.

The black liquor is washed from the pulp by countercurrent washing procedures on the pulp washers which are collectively designated at 20, the pulp being picked up on the drum 33 of the first washer 32 in the illustrated embodiment and transferred to the second washer 34, as indicated by arrow 35. The pulp on drum 33, however, is first washed with filtrate 36 derived from the filtrate tank 37 for the second washer 34. From washer 34, the pulp is picked up on the vacuum operated drum 38 thereof, and washed with filtrate 39, received from filtrate tank 40 for washer 41, and is transferred to washer 41 as indicated by arrow 42. The partially washed pulp in washer 41, in turn, is picked up on the washer drum 43, given a final hot water wash, as indicated by arrow 44, and is then removed from the washer as indicated at 45. The hot wash water 44, together with the black liquor which is present in washer 41, is drawn into the drum 43 and passed, as indicated by arrow 46, to the filtrate tank 40 for washer 41, and from which tank, the filtrate is withdrawn and used for washing purposes on washer 34. Similarly, the black liquor removed from the pulp on washer 34, as well as the filtrate used for washing purposes on the washer is withdrawn therefrom as indicated by arrow 47, and passed to filtrate tank 37. The filtrate in tank 37 is used then for first stage washing purposes on washer 32. The filtrate from washer 32 is withdrawn to the filtrate tank 48 therefor as indicated by arrow 49, from whence the weak black liquor is passed, as indicated by arrow 50, to foam tank 51. Filtrate tanks 37, 40 and 48 are vented, in the illustrated embodiment, to the foam tank 51, as indicated by arrow 52.

The foam from the foamy liquor which collects in tank 51 is broken in a foam breaker 52' atop the tank, from which the gases are emitted, as at 53. These gases 53 contain hydrogen sulphide and methyl mercaptan and may be treated as shown hereinafter. The weak black liquor from tank 51 is passed to the weak liquor tank 53, as indicated by arrow 53, from whence it passes, as indicated by arrow 57, to the oxidation system 55 which is embodied in the chemical recovery phase 2 of the illustrated embodiment, as is the case in most modern sulphate mills.

In the oxidation system which is illustrated in the embodiment, air 56 is passed counter-current to the weak liquor admitted to the top of the oxidation tower 58 so as to oxidize the odoriferous sulphur components of the liquor, the foamy liquor being passed from tower 58, as indicated by arrow 59, to an oxidized liquor tank 60. The foam on the liquor in tank 60 is broken, as it passes to the foam breaker 61 atop the tank, and the effluent gases from the oxidation system pass from the breaker 61, as indicated by arrow 63, after which they may be treated as indicated hereinafter. It will be understood, of course, that the invention has application to a sulphate process which operates without oxidation of the black liquor and that co-current oxidation systems exist and may be employed in lieu of, or in conjunction with, the illustrated system, and further that the black liquor may also be oxidized when desired at other points in the process prior to its being incinerated. In any event, the gases which are derived from such oxidation treatments, when such treatments are used, are highly objectionable and may be treated as herinafter indicated.

The oxidized liquor from the oxidation system 55 is passed, in the illustration, to the multiple effect evaporator 63, as indicated by arrow 64, wherein the weak oxidized black liquor is subjected to concentration in a plurality of successive stages of evaporation. By way of illustration, the multiple effect evaporator 63 is shown as including four effects respectively indicated at 65, 66, 67 and 68, effect 68 being used for the first stage of the black liquor concentration process. The multiple effect evaporator 63 illustrated is of the conventional type wherein the most concentrated liquor is discharged as at 87 from the first effect 65, the liquor being concentrated therein through indirect heat exchange with boiler steam admitted as at 69, the condensate obtained being removed from the effect 65 as at 70 and returned to the boiler water feed. The concentration which transpires in effect 65 is the last stage of evaporation in the stagewise concentration which transpires in the multiple effect evaporator 63, the liquor being fed to effect 65 from the second effect 66, as indicated by arrow 71. The water vapor derived by concentrating the black liquor in effect 65 is passed, as indicated by arrow 72, for heat exchange purposes to effect 66 and, from which effect, the condensate is removed as indicated by arrow 73. The third stage of concentration is carried out in second effect 66, which is fed black liquor from the third effect as indicated by arrow 74. The water vapor 75 from the second effect passes to the third effect 67, from which the vapor condensate is removed as indicated by arrow 76. The second stage of concentration transpires in effect 67, the concentrated liquor from the first stage being fed to the effect 67 from the fourth effect 68, as indicated by arrow 77. The water vapor derived from the second stage of concentration in effect 67 is passed, as indicated by arrow 78 to the fourth effect 68 in which the first stage of concentration is carried out, and from which the vapor condensate 68 is removed as at 79. The water vapor which is vaporized during the first stage of the evaporation process in the fourth effect 68 is passed to heat exchanger 81, as indicated by arrow 80. Exchanger 81 is fed cold water, as at 82, for indirect heat exchange purposes and the hot water is removed as at 83 for reuse in the process. The water vapor 80 fed to the condenser 81 is condensed and the first stage vapor condensate removed as indicated at 84. The uncondensed gases from the condenser 81 on the other hand are removed as at 85. The water vapor removed from the black liquor during the concentration stages subsequent to the first stage of evaporation and which is condensed for heat exchange purposes during the evaporation procedure are combined in the illustrated embodiment as indicated by arrow 86, and may be treated as indicated hereinafter, the heavy black liquor derived from the fourth stage of the concentration process being removed as indicated by arrow 87.

Figure 2:
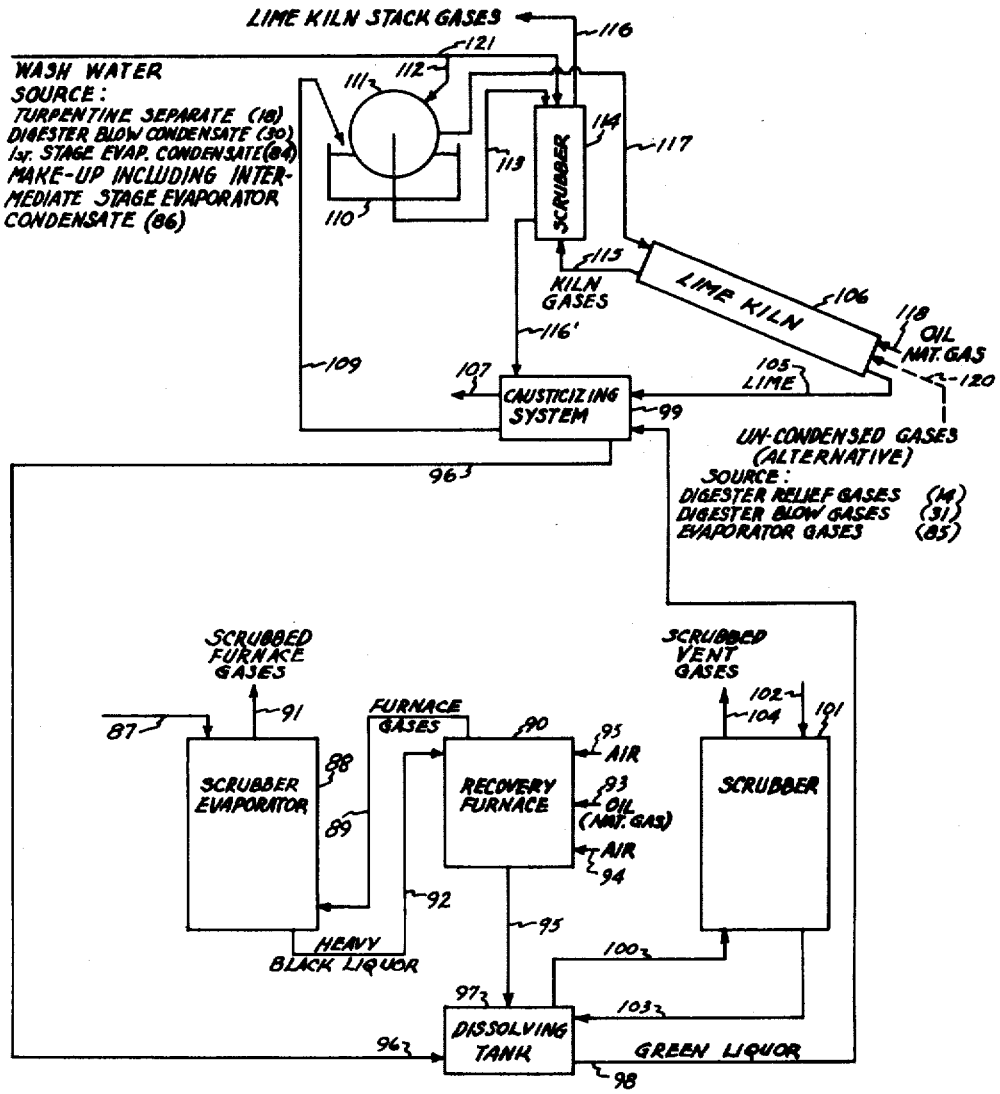
FIGURE 2 is a schematic flow diagram illustrating other processing steps which are normally followed in the chemical recovery phase of a sulphate process and which follow those shown in FIGURE 1, the illustration showing certain methods of treating and/or using waste components obtained from steps shown in FIGURE 1.

With particular reference to FIGURE 2, the heavy black liquor 87 from the multiple effect evaporator 63 is passed in the illustrated embodiment to a scrubber, indicated at 88, where it is scrubbed and further concentrated by direct contact with furnace gases 89 derived from the recovery furnace 90. The heavy black liquor is removed from the scrubber 88 and passed, as indicated by arrow 92, to the recovery furnace 90 wherein it is burned for heat recovery purposes. Fuel, such as oil or natural gas 93 together with primary air 94 and secondary air 95 may be added to the furnace, if necessary, to support combustion therein, the smelt produced being withdrawn, as at 95, and dissolved in weak wash water from the causticizing system 99 and, for example, which is fed to the dissolving tank 97 as indicated at 96. The green liquor 98 from the tank 97 is passed to the causticizing system 99. The vent gases 100 from the dissolving tank 97 are passed, in the illustrated embodiment, to a scrubber 101 wherein they are usually scrubbed with water 102, which is removed from the scrubber and returned to tank 97 for smelt dissolving purposes as indicated by arrow 103.

In the causticizing unit 99, the green liquor 98 is causticized with lime 105 derived from the lime kiln 106, the fresh cooking liquor being removed as indicated at 107 for subsequent use in the digester 4. The lime mud from the causticizing system is passed as indicated by arrow 109, to filter 110 in the illustrated embodiment wherein it is picked up on the vacuum drum 111 and washed with water 112 which may include turpentine separate 18, digester blow condensate 30 and first evaporation stage condensate 84, as indicated hereinafter. The filtrate from washer 110 is passed, as indicated by arrow 113, to the lime kiln gas scrubber 114 wherein the kiln gases 115 are scrubbed and then discharged as at 116. The washed mud from filter 110 is removed from the drum 111, as indicated by arrow 117, and passed to the lime kiln 116 wherein it is burned to form lime 105 by the combustion of a suitable fuel, such as oil or natural gas admitted to the kiln as at 118. The products of combustion and the water vapor former are removed from the kiln and passed to the scrubber 114 as indicated at 115.

The uncondensed gases from the digesters, namely the uncondensed digester relief gases 14 and the uncondensed digester blow gases 31 together with uncondensed evaporator gases 85 are preferably passed as indicated at 120 to the lime kiln 106 wherein they are burned to eliminate the odoriferous components therein. This burning, however, increases the sulphur dioxide content of the lime kiln gases which are subsequently passed to the stripper condenser 123, shown in FIGURE 3. Alternatively these gases may be passed, as indicated in FIGURE 1 by arrow 119 to the oxidation tower 58 and absorbed in the black liquor and oxidized to thio-compounds during the oxidizing procedure. Unoxidized gases would pass out with the oxidation system effluent gases 63, as seen in FIGURE 1 and be treated in conjunction with such gases as shown hereinafter.

In accord with the preferred embodiment of the invention, the blow condensate 30, the turpentine separate 18, and the evaporator condensate from the first stage of evaporation 84 are utilized for scrubbing the kiln gases 115 from the lime kiln 106. In this way the condensates having the highest bio-chemical oxygen demand can be retained in the process after being stripped of their dissolved odoriferous gases in the scrubber 114. These condensates may be fed directly to the scrubber, as indicated by arrow 121, or indirectly, as by initially being fed as wash water to the filter 110 for the lime mud, as indicated at 112 from whence they may be passed as the filtrate therefrom to the scrubber 114, as indicated by arrow 113. By utilizing the turpentine separate 18, the digester blow condensate 30 and the first stage evaporator condensate 84 as components of the waters employed for scrubbing the kiln gases 115, the normally gaseous odoriferous sulphur compounds, e.g. hydrogen sulphide and methyl mercaptan are stirpped from the condensates in the scrubber thus rendering these condensates substantially free of odoriferous compounds and rendering the condensates acceptable for further use in the process, as for example, in the causticizing system 99 to which they may be forwarded as indicated by arrow 116': The effluent sulphur dioxide containing gases 116 from the scrubber 114 are, of course, enriched in odoriferous gaseous substances stripped from the condensates employed in scrubber 114, but which, nevertheless, are most advantageously treated as indicated hereinafter.

With particular reference to FIGURE 3, the $SO_2$ containing hot water vapor laden gases as, for example, the scrubbed lime kiln gases 116 and the scrubbed recovery furnace gases 119 are fed, as indicated by arrow 122, to tower 123 wherein they are intimately contacted with a scrubbing liquid 124 that contains such normally gaseous odoriferous substances as hydrogen sulphide and methyl mercaptan, preferably the condensates derived from concentration stages which follow the first stage of evaporation in evaporator 63, as for example, the combined evaporator condensates 86. A portion of this evaporator condensate 86 may be also employed as make-up wash water to the lime kiln scrubber 114 as shown in FIGURE 2 when desired.

In tower 123, the hydrogen sulphide and methyl mercaptan containing scrubbing liquid 124 and the hot, water vapor laden sulphur dioxide gases 116 and 91 fed thereto as indicated at 122 are so proportioned as to provide conditions under which condensation of water vapor contained in the hot saturated gases 122 is caused to take place so that the reactions heretofore referred to will most readily proceed toward completion. The evaporator condensate 86 which is fed as scrubbing liquid 124 to tower 123 is also carbonated by the carbon dioxide contained in the hot saturated gases fed to the tower at 122 and the dissolved normally gaseous odoriferous sulphur compounds, e.g. hydrogen sulphide and methyl mercaptan, in the scrubbing liquid 124 are stripped from the condensates and pass out of the tower 123 with effluent gases 125. The underflow liquid which includes the stripped condensate and the condensed water vapor are withdrawn from the tower 123, as indicated by arrow 126, and passed to indirect heat exchanger 127 wherein they are cooled by cold water 128 which is passed therethrough and recovered as hot water 129 for use in the mill processes as boiler water, etc. The cooling of the liquids in heat exchanger 127 greatly increases the solubility factors for the residual unstripped gases retained in the stripped condensate and minimizes their release. If desired, the liquids from the heat exchanger 127 may be passed as indicated by 130, and further stripped of the residual gases by vacuum treatments and/or by passing air or stream 132 therethrough as in a stripping tower 131. The stripped gases may then be returned, as indicated by arrow 133 to tower 123 wherein they are accorded the aforementioned treatment. The underflow from stripper 131 passes out as indicated by 134 and if needed may be chlorinated with chlorine or bleach liquor or treated with bleach liquor wastes as indicated by arrow 135 to obtain an odor free aqueous solution which may be either returned to the process or discharged as waste material free of noxious components.

The residual odoriferous gas components of the effluent gases 125 from tower 123 are thereafter oxidized, as by chlorination in accord with the process. For this purpose chlorine gas or chlorine dioxide may be added to the effluent gases as at 140 and the saturated gases scrubbed, as in scrubbing tower 141, with acid bleach plant wastes 144, the scrubbing liquor being recycled as indicated by arrow 142, and a portion thereof being sewered, as at 143, as determined by the amount of make-up waste used. Such acid bleach plant wastes as are derived from the chlorination bleaching stages or the chlorine dioxide stages may be used in tower 141 for chlorinating the residual odoriferous sulphur compounds passed to tower 141.

The chlorinated or oxidized gases from tower 141 may be passed directly to the atmosphere as indicated by arrow 145, or if it is desired to eliminate residual unreacted chlorine, the gases may be passed to an alkaline scrubbing tower 147, as indicated by arrow 148, and therein accorded a further scrubbing treatment with an alkaline scrubbing liquid 149. This alkaline liquid 149 may be caustic bleach plant wastes, sodium hydroxide, sodium carbonate or calcium hydroxide solutions supplied to the tower 147 in amounts sufficient to absorb residual chlorine which may pass through the chlorination scrubber 141. The scrubbing liquor 149 may also be sodium or calcium hypochlorite bleach liquor or wastes from the hypochlorite stages of the oxidizing stages of the bleach plant. This treatment supplements the chlorination treatment and may be used to control residual chlorine contained in the effluent gases 148 from tower 141. The scrubbed gases emanating from tower 147, as at 150' are then discharged to the atmosphere. The underflow from tower 147 may be recycled as indicated by arrow 150, a portion of the recycled scrubbing liquid corresponding to the amount of make-up being sewered as indicated at 151.

As shown in FIGURE 2, in carrying the invention into practice, it is preferred to pass the turpentine separate 18, the digester blow condensate 30 and the first stage evaporation condensate 84 directly or indirectly to the lime kiln scrubber 114 so as to strip the dissolved odoriferous substances from the condensates, and thus enable the re-use of these condensates in the causticizing system 99. By this procedure the condensates which would normally have the greatest biochemical oxygen demand are retained within the sulphate processing system. In using this procedure the scrubbed effluent gases 116 from the scrubber 114 are enriched in odoriferous gaseous substances which are stripped from the condensates in the tower and are thereafter treated in tower 123 and chlorination tower 141. Optionally these condensates 18, 30 and 84, as seen in FIGURE 3 may be directly treated together with the evaporator condensates 86 in tower 123 and fed directly thereto as components of the scrubbing liquid 124 which is supplied to the condensing tower 123.

The oxidation system effluent gases 63, as well as the foam tank gases 53, contain appreciable amounts of $H_2S$ and methyl mercaptan and are normally also saturated with water vapor. Therefore, to enable further recovery of the heat from the oxidation system effluent gases 63 and foam tank gases 53 while simultaneously rendering the odoriferous gas substances therein innocuous, these gases, as seen in FIGURE 3, may be also passed directly to the stripper condenser tower 123 as components of the hot saturated gases 122, and therein subjected to the partial condensation of their water vapor contents while the methyl mercaptan and hydrogen sulphide contents of these gases 53 and 63 react with sulphur dioxide gases admitted to the tower.

It is preferable to pass the uncondensed gases, 14, 31 and 104, to the lime kiln 106 or else to the oxidation system 55, since in the former case the noxious sulphur compounds contained therein are transformed to $SO_2$ which may be utilized in the reactions which transpire in tower 123 whereas in the latter case a portion of the noxious sulphur compounds are oxidized to thiocompounds which are retained in the black liquor. On the other hand, the uncondensed gases, 14, 31 and 85, may be directy treated in tower 123 as by combining these gases with the gases fed to the stripper condenser 123 as indicated at 122. Still another alternative for controlling or minimizing contamination from these source materials is to by-pass the stripper condenser 123 with these gases 14, 85 and 31 and pass them directly to the chlorinating scrubbing tower 141 as indicated by arrow 140' wherein they are directly chlorinated.

From the foregoing, it is evident that by treating the various atmospheric and stream contaminating and polluting source materials in accord with the processes described herein, such contamination or pollution attributed to such materials can be effectively controlled in a relatively simple and economical manner which avoids the necessity for complete chlorination of the contaminating and polluting substances prior to their reuse or discharge as waste material.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a wood pulping process, the method of recovering heat from water vapor laden hot gases containing sulphur dioxide derived from the chemical recovery phase thereof and of treating an aqueous condensate containing normally gaseous odoriferous sulphur compounds to minimize atmospheric contamination with said odoriferous sulphur compounds and said sulphur dioxide comprising stripping the odoriferous sulphur compounds from said condensate and simultaneously condensing water vapor from said hot gases by intimately contacting said condensate with said hot gases whereby a portion of said odoriferous sulphur compounds are transformed to innocuous substances by reaction with the sulphur dioxide contained in said hot gases, passing the stripped condensate and condensed water vapor into indirect heat exchange with water to be used in said process to minimize the release of residual sulphur compounds contained in said stripped condensate and to recover heat therefrom, and chlorinating the residual odoriferous sulphur compounds contained in the gases derived from said stripping and condensing step.

2. In a wood pulping process, the method in accord with claim 1 wherein said hot gases contain sulphur dioxide including gaseous derivatives of the combustion of a sulphur-compound-containing fuel in the lime kiln used in the chemical recovery phase of said process.

3. In a wood pulping process, the method in accord with claim 1 wherein said hot gases containing sulphur dioxide include gaseous derivatives of the combustion of spent cooking liquor.

4. In a wood pulping process, the method in accord with claim 1 wherein spent cooking liquor used in said process is concentrated by successive stages of evaporation by multiple effect evaporation and wherein said aqueous condensate containing said normally gaseous odoriferous sulphur compounds is obtained from a stage following the first of said successive stages of concentration.

5. In a sulphate wood pulping process wherein black liquor is concentrated in successive evaporation stages in the chemical recovery phase of said process, wherein hot gases containing sulphur dioxide are obtained from the lime kiln used in said phase, the method of minimizing atmospheric contamination with said sulphur dioxide and with normally gaseous odoriferous sulphur compounds dissolved in the condensed vapors recovered from said evaporation stages and of further recovering heat from said hot gases comprising the steps of first passing condensed water vapors derived from the first of said evaporation stages into intimate contact with said hot gases to scrub said hot gases and to simultaneously strip from the condensed water vapors the normally gaseous odoriferous sulphur compounds dissolved therein, passing condensed vapors derived from an evaporation stage following said first of said evaporation stages into intimate contact with the scrubbed gases derived from said first passing step to strip therefrom the normally gaseous odoriferous sulphur compounds dissolved therein, the step involving the last mentioned intimate contact being carried out under conditions for condensing water vapor contained in the scrubbed gases derived from said first passing step, thereafter chlorinating the residual normally gaseous odoriferous sulphur compounds contained in the gases derived from the step involving said last mentioned intimate contact, and passing the stripped condensate and condensed water vapor from the step involving said last mentioned intimate contact into indirect heat exchange with water to be used in said process to cool and minimize release therefrom of residual normally gaseous sulphur compounds contained therein.

6. In a sulphate wood pulping process wherein black liquor is concentrated in successive evaporation stages and thereafter burned in a recovery furnace in the chemical recovery phase of said process, wherein hot gases containing sulphur dioxide are obtained from the lime kiln used in said recovery phase, the steps comprising separately scrubbing the hot gases obtained from said recovery furnace and from said lime kiln by processing steps which include the step of passing condensed water vapors derived from the first of said evaporation stages into intimate contact with said hot gases obtained from said lime kiln to strip normally gaseous odoriferous sulphur compounds therefrom, passing the condensed water vapors derived from evaporation stages following said first of said evaporation stages into intimate contact with the scrubbed gases derived from said recovery furnace and said lime kiln to strip therefrom normally gaseous odoriferous sulphur compounds dissolved therein, the step involving the last mentioned intimate contact being carried out under conditions for condensing water vapor contained in the scrubbed gases subjected to said last mentioned intimate contact, thereafter chlorinating the residual normally gaseous odoriferous sulphur compounds contained in the gases derived from the step involving said last mentioned intimate contact, and passing the stripped condensate and condensed water vapor derived from the step involving said last mentioned intimate contact into indirect heat exchange with water to be used in said process to minimize release therefrom of residual normally gaseous sulphur compounds contained therein.

7. In a sulphate wood pulping process wherein spent black liquor is oxidized by being intimately contacted with air in black liquor oxidation step, wherein the oxidized black liquor is concentrated in successive evaporation stages and thereafter burned in a recovery furnace, and wherein hot gases containing sulphur dioxide are obtained from the lime kiln used in the chemical recovery phase of said process, the method of minimizing atmospheric contamination and of recovery of heat from said gases comprising the step of scrubbing the hot gases obtained from said recovery furnace and from said lime kiln, the step of passing the residual gases from the black liquor oxidation step and the scrubbed gases from said step of scrubbing into intimate contact with condensed vapors derived from stages of said evaporation following the first of successive evaporation stages to strip normally gaseous odoriferous compounds dissolved in said condensed vapors therefrom, the step involving the last mentioned intimate contact being carried out under conditions for condensing water vapor contained in the gases passed thereto whereby the sulphur dioxide in the said gases passed thereto react with the normally gaseous odoriferous sulphur compounds to transform a portion thereof to innocuous substances, the step of thereafter chlorinating the residual gaseous odoriferous sulphur compounds contained in the gases derived from the step involving said last mentioned intimate contact, and the step of passing the stripped condensate and condensed water vapor from the step involving said last mentioned intimate contact into indirect heat exchange with water to be used in said process to cool said stripped condensate and condensed water vapor and thus minimize release of residual normally gaseous sulphur compounds contained therein.

8. In a sulphate wood pulping process wherein uncondensed gases evolved in said process are burned in the lime kiln used in the chemical recovery phase of said process, and wherein the black liquor derived from the pulping phase of said process is concentrated in successive stages of evaporation, the improvement comprising scrubbing the hot gases derived from said lime kiln with waters that include condensed water vapor derived from the first of said stages of evaporation, thereafter passing condensed water vapor derived from stages subsequent to said first of said stages of evaporation into intimate contact with gases derived from said scrubbing step to strip normally gaseous odoriferous sulphur compounds therefrom, said step involving said intimate contact being carried out under conditions for condensing water vapor contained in the gases passed thereto, chlorinating the residual gaseous odoriferous sulphur compounds contained in the gases derived from the step involving said intimate contact and passing the stripped condensate and condensed water vapor from the step involving said intimate contact into indirect heat exchange with water to be used in said process to cool said stripped condensate and condensed water vapor.

9. In a sulphate process wherein uncondensed gases containing malodorous substances are evolved, and wherein black liquor is concentrated in successive stages of evaporation, the improvement comprising passing air and said uncondensed gases into intimate contact with black liquor prior to the concentration thereof to oxidize said liquor and said malodorous substances, thereafter passing condensed water vapor derived from said evaporation stages into intimate contact with gases derived from the oxidation of said black liquor and said malodorous substances to strip normally gaseous odoriferous sulphur compounds therefrom, the last mentioned step involving said intimate contact being carried out under conditions for condensing water vapor in the gases derived from the said oxidation step, chlorinating the normally gaseous odoriferous sulphur compounds stripped from said condensed water vapor, and cooling the liquid components derived from the stripping and condensing step to minimize the release of odoriferous gases therefrom.

10. In the sulphate process, the method of treating hot sulphur dioxide containing water vapor laden gases and evaporator condensate containing normally gaseous odoriferous sulphur compounds, comprising passing said hot gases and said condensate into intimate contact to condense water vapor from said gases, to strip the normally gaseous odoriferous sulphur compounds therefrom and to transform a portion thereof to innocuous substances, chlorinating the residual odoriferous sulphur compounds retained in the gases evolved from the condensing and stripping step, cooling the condensed water vapor and stripped condensate, passing air through the cooled liquid from the last step to strip residual odoriferous gases therefrom, and passing the stripped residual odoriferous gases to said condensing and stripping step.

References Cited by the Examiner
UNITED STATES PATENTS

| | | | |
|---|---|---|---|
| 1,793,264 | 2/31 | Tschuwikowsky | 162—43 |
| 1,854,428 | 4/32 | Segerfelt | 162—51 |
| 2,772,240 | 11/56 | Trobeck | 162—30 |
| 2,962,344 | 11/60 | Kurmeier | 23—2 |
| 3,028,295 | 4/62 | Trobeck | 162—51 |

OTHER REFERENCES

Gordon: Chlorine as a Deodorant in Sulphate Paper Pulp Manufacture, Paper Trade Journal, pp. 81–85, April 28, 1938.

DONALL H. SYLVESTER, *Primary Examiner.*

MORRIS O. WOLK, *Examiner.*